June 4, 1929. H. G. GILLMOR Re. 17,314

ANTICREEPER

Original Filed Aug. 2, 1923 2 Sheets-Sheet 1

INVENTOR

H. G. Gillmor.

BY

R. S. A. Dougherty.

ATTORNEY

June 4, 1929. H. G. GILLMOR Re. 17,314

ANTICREEPER

Original Filed Aug. 2, 1923 2 Sheets-Sheet 2

INVENTOR

H. G. Gillmor.

BY

R. S. G. Dougherty.

ATTORNEY

Reissued June 4, 1929. Re. 17,314

UNITED STATES PATENT OFFICE.

HORATIO G. GILLMOR, OF WASHINGTON, DISTRICT OF COLUMBIA.

ANTICREEPER.

Original No. 1,636,506, dated July 19, 1927, Serial No. 655,323, filed August 2, 1923. Application for reissue filed March 31, 1928. Serial No. 266,406.

My invention relates to devices for preventing the longitudinal creep of railroad rails, such devices being commonly known as anticreepers, rail anchors, creepchecks or rail stays.

One of the objects of the invention is to provide a device of this type which will be simple in its construction, inexpensive to manufacture, light in weight, strong and capable of taking a firm and reliable hold on the rail. Another object is to provide a device whose grip upon the rail will not be affected by vibration, movement of the rail, temporarily, in a direction the reverse of that in which the rail tends to creep or by any other cause tending to loosen the grip of anticreepers on the rails engaged thereby.

A further object is to provide a device constructed in one piece, which may be quickly and conveniently applied to the rail by unskilled labor.

The device possesses other features of novelty and advantage, which, with the foregoing, will be obvious from the following description.

Two embodiments of the invention are shown in the accompanying drawings, in which.

Figure 1:
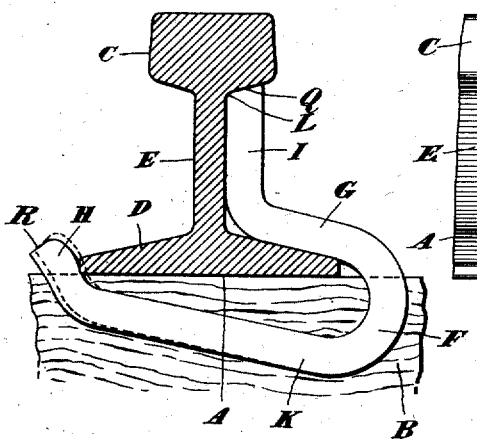
Figure 1 is an elevation, with the rail in section, showing the device in position.

The rail A is of the usual construction with a head C, web E and base D, and rests upon cross ties one of which is shown at B. The anticreeper F is constructed with a portion I adapted to engage the web E, a portion G adapted to engage the top of the base D at one side and a portion H adapted to engage the base D at the other side of the rail A, the intervening body portion K serving to connect the portions engaging opposite sides of the rail and as a means of engagement of the anticreeper F with the cross tie B.

The several portions are so constructed and related that the anticreeper F may be placed in the position, shown by the full lines in Figures 3 and 7 with the portion K transversely below the rail A, the portion I contacting at L with the web E, the portion G contacting at M at one side of the base D and the portion H contacting at N at the other side of the base D; and then forced to the position shown in Figures 1, 2, 5 and 6 by blows of a hammer, or other suitable implement, applied in the direction of the small arrow P in Figures 3 and 7 or other equally convenient application of force. The anticreeper F will thus be forcibly moved angularly and transversely upon the rail and will assume successive angular positions, one of which is shown by dotted lines in Figure 3.

The several portions I, G and H of the anticreeper F are so formed and related one to the other that, in the unstressed condition of F, before application to the rail, the terminal arm H is nearer to the terminal arm composed of I and G than it is after F has been brought to its proper final gripping position on the rail A. The arm H is constructed with a surface O arranged to ride upon the lower corner N of the base D during the forced movement of F upon the rail A so as to strain the anticreeper F from its form when unstressed, indicated by the dotted lines in Figures 1 and 5, to the form assumed in the stressed condition in which it is after application to the rail A, shown by the full lines in Figures 1 and 5. The form of the surface O is such that the change in form from the unstressed to the stressed condition of the anticreeper F is effected gradually and in proportion to the movement of F toward its proper final gripping position; and that the grip of F upon the rail A in all intermediate positions on the rail A, between the initial position shown in Figures 3 and 7 and the final gripping position shown in Figures 1 and 5, will retain F upon the rail A in any and all such intermediate positions and thus permit a succession of blows applied to F at P, to drive F to its final position.

While an excellent lock on the rail is obtained by gripping only the web and top of the base flange at one side of the rail, and the lower corner of the base flange at its other side, the portion I of the anticreeper F may be extended and provided with a surface Q, adapted to engage, when F is in final gripping position, the under side of the head C; so that, in such final position, the portions I and G would be forced in between the rail head and base and would then seat in what is often referred to as the fishing space of the rail A, in a manner similar to the engagement of this space, at the joint, by the fish bar.

It will readily be seen that after the anticreeper F has been forced to its final gripping position on the rail, shown in Figures 1, 2, 5, and 6, the portion I, whatever its length, is firmly pressed against the web E and the portion G against the base D and, if the portion I is made extended and provided with the surface Q the under side of the rail head C will be engaged and pressed upon. The rail A is thus firmly gripped by the anticreeper F and engagement of the portion H with the base D at the other side of the rail A, effectually locks the anticreeper F in position on the rail A.

Figure 2:
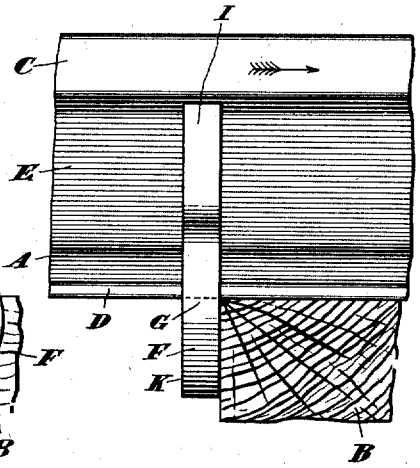
Figure 2 is a side elevation, with the cross tie in section, showing the device in position.
Figure 3:
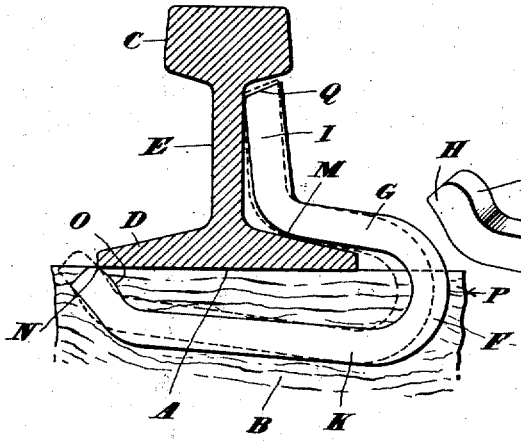
Figure 3 is an elevation, with the rail in section, illustrating the method of applying the device to the rail.
Figure 4:
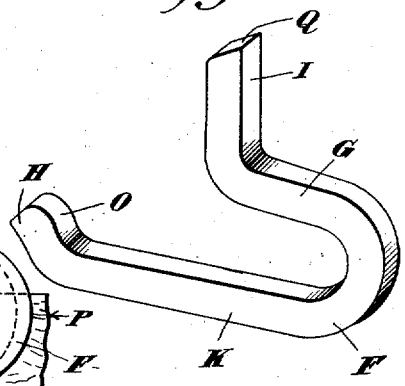
Figure 4 is a perspective view of the device.
Figure 6:
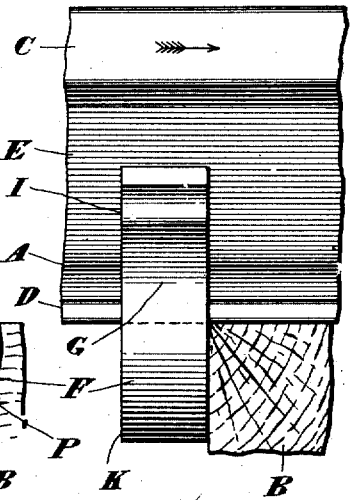
Figure 7:
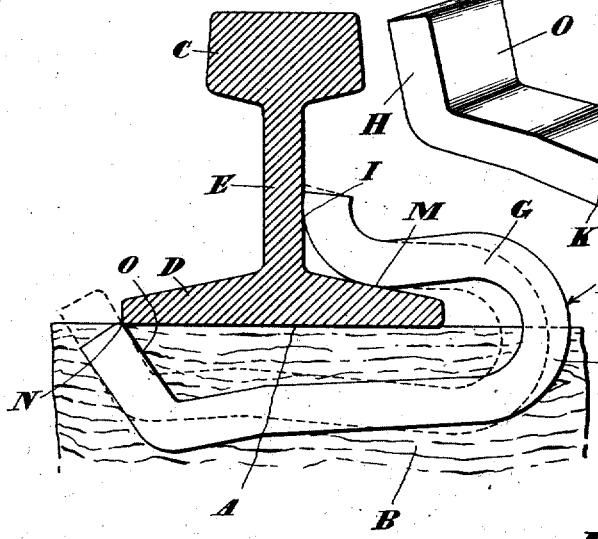
Figure 7 illustrates the application of the device to the rail.
Figure 8:
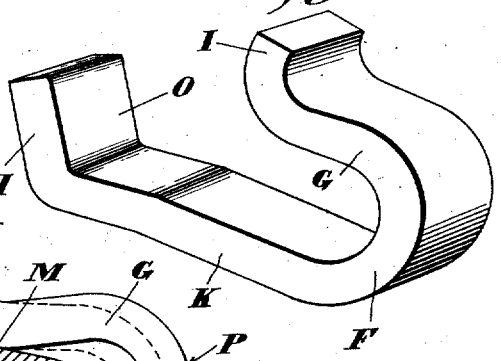
Figure 8 is a perspective view of this form of the device.

The direction in which the rail A tends to creep is indicated by the arrow in Figures 2 and 6. Contact of the body portion K of the anticreeper F with the cross tie B prevents forward movement of the anticreeper and its grip upon the rail A thus holds the rail and prevents the creeping movement of A. Engagement of the body portion K with the cross tie B will generally be as some distance below the bottom of the base D of the rail A so that any tendency of the rail A to move forward will tend to tilt the anticreeper F and thus increase its grip upon the rail A.

Figure 5:
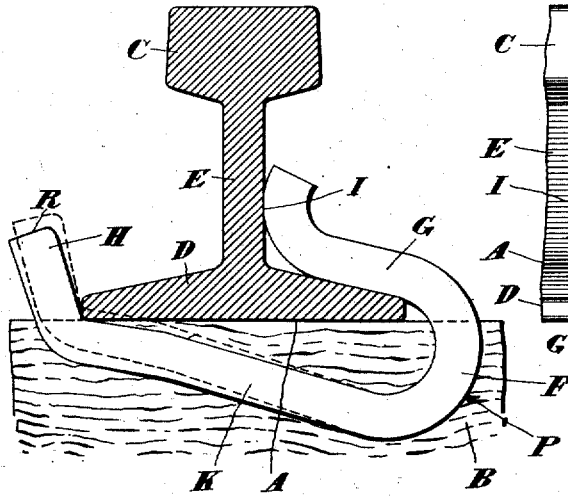
Figures 5 and 6 are, respectively, an elevation with the rail in section and a side elevation with the cross tie in section, showing another form of the device in place on the rail.

If it is desired to remove the anticreeper F from the rail A it is necessary to apply force, preferably by striking the terminal arm H in the direction of the arrow at R in Figures 1 and 5. Several blows may be necessary. Their effect is to produce angular and transverse movement of the anti-creeper F upon the rail A in a direction which is the reverse of that taken in applying the anticreeper to the rail, the successive positions assumed by F in being removed being that shown in Figures 1 and 5 followed by others, one of which is indicated by the dotted lines in Figures 3 and 7, until the position indicated by the full lines in Figures 3 and 7 is reached when the anticreeper F will fall from or may be removed with the hand from the rail A.

It will readily be seen that the anticreeper F may be easily and cheaply fashioned from a rolled bar of suitable metal; that it may be applied with ease by unskilled labor; and that, while effectually locked in position so as to prevent accidental displacement or loosening upon the rail, it may be easily and rapidly removed from the rail.

While I have described but two embodiments of my invention, it will be obvious that modifications might be made without departing from the principles of the invention. Therefore, I do not wish to be understood as limiting the invention to the particular constructions, arrangement and devices shown and described, except so far as these limitations are specifically set forth in the claims.

I claim:

1. An anticreeper, comprising a body, adapted to bear against a cross tie and to be out of contact with the bottom of the rail base, and end portions disposed so as to rigidly engage the web and upper surface of the base at one side of the rail and the edge of the rail base at the other side of the rail.

2. A rail anchor, comprising a single piece of metal, end portions of which grip the web and top of the rail base at one side of the rail and the edge of the rail base at the other side of the rail, and a body portion constructed to be out of contact with the bottom of the rail base, and adapted to engage a cross tie.

3. A rail anchor comprising a body adapted to bear against a cross tie, and end portions disposed so as to engage and grip the web and base of a rail at one side and the rail base at the other side of the rail when said rail anchor is applied to the rail, and forcibly moved thereon angularly in a plane transverse to the rail.

4. An anticreeper for rails including a body member adapted to engage a cross tie but not the bottom of the rail base, and end portions adapted to engage and grip the web and upper surface of the base of the rail at one side and the edge of the base of the rail at the other side of the rail.

5. An anticreeper formed from a single bar of metal bent to form a body portion adapted to engage a cross tie and to be held out of contact with the bottom of the rail base, and terminal arms of unequal length adapted to grip the web and base of the rail at one side of the rail and the rail base at the other side of the rail.

6. An anticreeper for rails including a body member engageable with a cross tie but not with the bottom of the rail base, and terminal gripping arms formed on the body member for securing said anticreeper on the rail by engagement with the web at one side and the rail base at the other side, said anticreeper being adapted to be moved angularly in a plane transverse to the rail after being applied thereto, whereby the grip of said arms upon the rail may be tightened or loosened.

7. A rail anchor formed from a single bar of metal bent at its ends to form a long arm adapted to engage the web and upper surface of the rail base at one side and a short arm adapted to engage the edge of the rail base at the other side.

8. An anticreeper comprising a member having the ends thereof formed to engage and grip the web and upper surface of the base of the rail at one side and the lower corner of the base of the rail at the other side of the rail, said anticreeper being adapted to move angularly transversely upon the rail after being applied thereto to effect the gripping action and lock said anticreeper on the rail.

9. A rail anchor comprising a single bar of metal bent to form a body portion adapted to bear against a tie below the rail base, and terminal portions engageable with the web and upper surface of the rail base at one side of the rail and with the lower corner of the rail base at the other side of the rail said anticreeper being adapted to be moved in a plane transverse to the rail after being placed thereon to effect the gripping action and lock said anticreeper in position on the rail.

10. An anticreeper comprising a body portion adapted to engage a cross tie but not the bottom of the rail base, a short arm adapted to engage the lower corner of the rail base at one side of the rail, and a portion adapted to be forced in between the head and base of the rail at the other side of the rail.

11. An anticreeper comprising a single bar of metal bent to form a body portion engageable with a cross tie but not the bottom of the rail base, an end portion adapted to be forced in between the head and base of the rail at one side of the rail, and an end portion adapted to engage the lower corner only of the rail base at the other side of the rail.

12. In an anticreeper, a body disposed transversely and beneath the bottom of the rail, and a pair of terminal arms adapted to rigidly engage the web, the under surface of the head and the top of the base of the rail at one side, and the lower corner of the rail base at the other side of the rail when said body is forcibly moved transversely of the rail, and thereby retain the anticreeper in position upon the rail.

13. An anticreeper formed from a single bar of metal bent at its ends to form arms of unequal length, the longer adapted to engage the web and upper surface of the base of the rail at one side of the rail, and the shorter the lower corner of the base of the rail at the other side of the rail.

14. The combination with a cross tie and a railroad rail having a head, web and base, of an anticreeper provided with a portion engaging the web and base of the rail at one side of the rail, a portion engaging a cross tie to prevent forward movement, and a portion engaging the rail base at the other side of the rail to prevent lateral displacement of said anticreeper.

15. In an anticreeper, a body disposed so as to be out of contact with the bottom of the rail and a pair of terminal arms adapted to rigidly engage the web and top of the rail base at one side, and a corner of the rail base at the other side of the rail, when said body is forcibly moved transversely of the rail, thereby to retain the anticreeper in position upon the rail.

16. A one-piece anticreeper comprising a body adapted to engage a cross tie below the rail base, two end arms, one extending inwardly and upwardly and one extending outwardly and upwardly both lying substantially in the plane of the body, and serving by transverse pressure upon the web and vertical and transverse pressure upon the rail base to cause the anticreeper strongly to grip the rail.

17. An anchor, comprising an under rail portion, an end portion extending inwardly over the under rail portion and having a curved portion at the free end thereof adapted to pivotally engage one side of the rail and bear against the web thereof when the anchor is applied to said rail with a transverse angular movement, and an end portion adapted to engage the opposite side of the rail.

18. An anchor, comprising an under rail portion, an end portion extending upwardly and inwardly over said under rail portion and having a curved portion at the free end thereof, adapted to engage surfaces at one side of the rail in the regions at each side of and in proximity to the point of junction of the base flange and the web, and a second end portion extending from said under rail portion adapted to engage the other side of the rail.

19. In a railway track construction, a tie, a rail supported on said tie, an anchor mounted on said rail comprising an under rail portion, an end portion extending over the base flange at one side of the rail and bearing on the rail at the region of the junction of the base flange with the web and creating a strong pressure on the rail in a direction transversely of the web of the rail, and an end portion engaging the other side of the rail resisting the action of the first mentioned end portion.

20. A one-piece anticreeper comprising a body adapted to engage a cross tie below the rail base, two end arms, one extending inwardly, and serving by pressure upon the web in a transverse direction and by pressure on the rail base in a vertical and transverse direction to cause the anticreeper strongly to grip the rail.

21. An anchor, comprising an under rail portion, a portion adapted to engage the web at one side of a rail, and a portion adapted to engage the edge of the base flange at the other side of said rail, whereby upon forcing the anchor transversely of said rail it is distorted and in tending to assume its original shape causes a strong gripping action on said web and on said edge of the base flange.

22. An anchor, comprising an under rail portion, an end portion extending upwardly and inwardly over said under rail portion adapted to engage the web at one side of a rail, and an end portion extending upwardly from said under rail portion adapted to engage the opposite side of the rail, whereby upon the anchor being forced transversely on a rail it is distorted and in tending to assume its original shape exerts a strong bearing pressure on the rail in a direction substantially at right lines to the direction in which the second mentioned end portion extends, said bearing pressure being resisted by the pressure of the latter portion against said opposite side of the rail.

23. An anchor, comprising an under rail portion, an end portion adapted to bear against the web at one side of a rail, and an end portion adapted to bear against the opposite side of the rail, whereby upon forcing the anchor transversely of said rail it is distorted and in tending to assume its original shape causes a strong initial gripping action on the rail.

24. An integral anchor comprising an under rail portion having a member adapted to bear with pressure against a base flange of the rail and an overhanging portion adapted to press against the opposite side of the rail at the region between the point of tangency of the fillet with the upper surface of the base flange and the junction of the web with the head of the rail and impose its greatest component pressure on the rail, to resist the pressure of said member against the base flange, in a plane intersecting the vertical axis of the rail above its bottom surface, when the anchor is applied to its gripping position on the rail.

25. An anchor having an under rail portion, a rail flange overhanging portion adapted to engage one side of a rail in the region between the upper surface of its base flange and the under surface of its head, and a toe portion extending from the under rail portion adapted to engage the opposite side of the rail, a part of the anchor being deformable to bring the metal under stress during the placing of the anchor on the rail to effect a gripping action on the rail by said engaging portions.

26. An integral anchor having an under rail portion, a rail flange overhanging portion adapted to engage one side of a rail in the region between the upper surface of its base flange and the under surface of its head and a toe portion extending from the under rail portion adapted to engage the opposite side of the rail, a part of the anchor being deformable to bring the metal under stress during the placing of the anchor on the rail to effect a gripping action on the rail by said engaging portions.

27. An anchor comprising a portion adapted to engage the edge of a flange on one side of the rail, a portion adapted to engage the other side of the rail at a region between the upper edge of the flange and the junction of the web with the head of the rail, and a portion deformable during placement of the anchor on the rail to effect a gripping action between the said engaging portions on the rail.

28. A unitary anchor comprising rail engaging portions adapted to engage opposite sides of the rail in different horizontal planes above the base of the rail, an under rail portion substantially out of engagement with the base of the rail, said anchor being deformable during placement to effect a gripping between said rail engaging portions to grip the anchor to the rail.

29. A unitary anchor comprising portions adapted to engage opposite sides of the rail in different horizontal planes, said anchor being deformable during placement of the anchor to cause said engaging portions to press cooperatively against the rail in opposite directions in a plane of direction passing through the rail in a diagonal direction.

30. A unitary anchor comprising portions adapted to engage opposite sides of the rail, a portion deformable during placement of the anchor on the rail to cause said engaging portions to press cooperatively against the rail in opposite directions in a plane of direction passing through the rail in a diagonal direction.

31. In a railway track construction, a tie, a rail supported on said tie, an anchor mounted on said rail comprising an under rail portion, an end portion extending over the base flange at one side of the rail and bearing on the rail at the regions on each side of the junction of the base flange with the web and creating a strong pressure on the rail in a direction transversely of the web of the rail, and an end portion engaging the other side of the rail resisting the action of the first mentioned end portion.

HORATIO G. GILLMOR.